US010160155B2

(12) United States Patent
Zuercher et al.

(10) Patent No.: US 10,160,155 B2
(45) Date of Patent: Dec. 25, 2018

(54) METHOD TO OPTIMIZE REGULATED PRESSURE TO A CYCLICAL AIR APPLICATION

(71) Applicants: Jan Arthur Zuercher, Spanish Fort, AL (US); Dean Ellis Smith, Macon, GA (US)

(72) Inventors: Jan Arthur Zuercher, Spanish Fort, AL (US); Dean Ellis Smith, Macon, GA (US)

(73) Assignee: Blake & Pendleton, Inc., Macon, GA (US)

(*) Notice: Subject to any disclaimer, the term of this patent is extended or adjusted under 35 U.S.C. 154(b) by 578 days.

(21) Appl. No.: 14/853,096

(22) Filed: Sep. 14, 2015

(65) Prior Publication Data
US 2017/0072619 A1 Mar. 16, 2017

(51) Int. Cl.
*B29C 49/42* (2006.01)
*B29C 49/78* (2006.01)
*B29L 31/00* (2006.01)

(52) U.S. Cl.
CPC ........ *B29C 49/4289* (2013.01); *B29C 49/783* (2013.01); *B29C 2949/78537* (2013.01); *B29C 2949/78806* (2013.01); *B29L 2031/7158* (2013.01)

(58) Field of Classification Search
CPC ............. B29C 49/4289; B29C 49/783; B29C 2949/78806; B29C 2949/78537; B29L 2031/7158; Y10T 137/7761; Y10T 137/7762; Y10T 137/777

USPC .................. 137/487.5, 488, 492.5
See application file for complete search history.

(56) References Cited

U.S. PATENT DOCUMENTS

| 2,125,601 | A |   | 2/1937 | Busch |   |
|---|---|---|---|---|---|
| 2,952,264 | A |   | 3/1955 | Burns |   |
| 3,982,558 | A | * | 9/1976 | Ochs | G05D 16/0652 137/488 |
| 5,047,965 | A | * | 9/1991 | Zlokovitz | G05D 16/2093 137/487 |
| 5,556,271 | A |   | 9/1996 | Zuercher et al. |   |
| 5,694,682 | A |   | 12/1997 | Zuercher et al. |   |
| 5,817,348 | A | * | 10/1998 | Ikeda | B29C 49/783 425/529 |
| 6,354,319 | B1 | * | 3/2002 | Mooney | G05D 16/163 137/489 |
| 6,584,999 | B2 |   | 7/2003 | Inayama et al. |   |
| 6,779,541 | B2 | * | 8/2004 | Inayama | G05D 16/2093 137/487.5 |
| 7,519,505 | B2 |   | 4/2009 | Zuercher et al. |   |

OTHER PUBLICATIONS

Cashco Installation, Operation & Maintenance Manual (IOM) IOM-DA4, 11-13, Model DA4 (Formerly DA3/4) Direct-Acting, Pressure Loaded Pressure Reducing Regulator, 16 pages.

(Continued)

*Primary Examiner* — Eric Keasel
(74) *Attorney, Agent, or Firm* — Thomas | Horstemeyer, LLP

(57) ABSTRACT

An air flow control assembly moves a pressurized air stream to a cyclical application, such as a molding machine, with air pressure at the cyclical application returned to the air flow control assembly to modulate the rate at which the air stream is delivered to the cyclical application.

11 Claims, 6 Drawing Sheets

(56) References Cited

OTHER PUBLICATIONS

Cashco Technical Bulletin, DA4-TB, 04-14, Model DA4 (Formerly DA3 and DA4), Do-All Series IV, Pressure Reducing Regulator Pressure Loaded Diaphragm: 1/2"-4" (DN15-100), 20 pages.
Fisher Bulletin 71.1:630, Nov. 1998, Type 630 Big Joe High-Pressure Regulator, 12 pages.
Integrated web pages, Magazine Sprinkler System, Feb. 23, 2015, 3 pages.
IZ Systems, Guaranteed Compressed Air Solutions, Proper Installation of IZ HP High Performance Pressure Supply System for Single-Stage/One-Step PET Molding Machines, Jan. 13, 2015, by Jan Zuercher, 10 pages.

\* cited by examiner

Fig. 1 – Prior Art

METHOD TO OPTIMIZE REGULATED PRESSURE TO A CYCLICAL AIR APPLICATION

SUMMARY OF THE INVENTION

This invention concerns a method and apparatus for controlling the pressure and flow of air to a cyclical air demand application, such as a one-step molding machine that blows plastic bottles and the like.

BACKGROUND OF THE INVENTION

In the production of molded products such as plastic bottles, fluid plastic material is moved into the cavities of the molding machine and air is moved into the cavities of the molding machine at a predetermined pressure and velocity to urge flowable plastic into the spaces and shapes of the molding cavities of the molding machine.

Typically, a molding machine will have a plurality of duplicate mold cavities arranged in parallel so that a plurality of molded products will be formed simultaneously from the same molding machine on each cycle of operation of the molding machine. For example, six to twelve or even more mold cavities will simultaneously receive flowable plastic material and then receive compressed air that stretches the plastic in each of the cavities to help form a plurality of molded products. The plastic and pressurized air are received in surges during each cycle of operation of the molding machine.

It is desirable to deliver the pressurized air simultaneously to all of the mold cavities at the same and constant pressure during the cycles of operation of the molding machine. The compressors that supply pressurized air is moved through an inlet conduit to an air pressure regulator that reduces and controls the pressure of the air moving through a delivery conduit into the molding machine. The air pressure regulator typically includes a spring loaded regulator that reduces the pressure and modulates the flow of the air to supply the air at a constant lower pressure moving to the molding machine. When there is a change in the air pressure moving from the air pressure regulator through the delivery conduit and into the molding machine, the spring loaded diaphragm changes its valve position to adjust the flow of air approaching the molding machine, to compensate for the change.

In the typical prior art air supply system used with multiple cavity molding machines there is a likelihood that the pressure of the air delivered to the mold cavities will vary significantly during each cycle of operation of the molding machine due to deficiencies in the spring loaded air pressure regulator design and application. This regulator limits the pressure to all aspects of the machine and is located external to the machine for convenient access. When the blow valves open to supply air to the mold cavities, there is a delay in the regulator response due to its distance from the blow valves. This creates an undesirable reduction in pressure supplied to the molds. The prior art also has significant hysteresis, further slowing its response. The spring pressure varies with the amount of spring compression which also creates a delay in the regulator response. These types of regulators tend to have smaller orifice passageways resulting in higher pressure drop and slower response to downstream changes in pressures. These issues result in an excessive and undesirable decrease in the pressure of the air entering the mold cavities at the start of the air injection cycle. This excessive decrease in air pressure tends to lengthen the time to cycle the molding machine, to assure that the air pressure reaches the desired level and the plastic has been properly seated and cooled in the cavities of the molding machine. Also, these repetitive delays during each cycle of operation of the molding machine add up during the periods in which the molding equipment operates to produce the work products, so that fewer products are cast over a given period of time. This large initial decrease in pressure is often compensated for by elevating the regulator setpoint pressure. This results in wasting air as the application is over-pressurized above the optimum pressure. A dedicated secondary regulator could be installed closer to the blow valves to eliminate the delay, but that would increase costs and be less accessible and less convenient for the operator to adjust the pressure.

An example of the sequence of air pressures of a typical prior art device that supplies air to multiple cavity molding machines is shown in FIG. 1 of the drawings. FIG. 1 is a graph that shows how the air pressure supplied to a cavity of the molding machine is substantially below the desired pressure at the start of each cycle of the molding machine. This is illustrated by the drop of the air pressure from about 365 psig to about 229 psig. The typical prior art air supply device also does not achieve the setpoint pressure between cycles. This is illustrated by only achieving 348 psig instead of returning to 365 psig at the end of each cycle.

The prior art teaches that in order to minimize the amount of undesired reduction of the pressure of the air moving to the molding machine, a large air tank, known as an external "blow tank", may be added to the air supply line that leads from the source of the regulated air to the molding machine. This is a result of the case where air that is delivered under pressure to the molding cavities is delivered to the mold cavities more rapidly than the oncoming replacement air moving into the air supply conduit, reducing the amount of pressure droop of the air entering the mold cavities. The external blow tank accumulates a large volume of the air at its desired controlled pressure. The blow tank is mounted externally due to space constraints inside the machine. However, this arrangement results in the regulator being mounted even farther from the blow valves, exacerbating the delayed response mentioned above. The blow tank also results in smaller changes in the pressure of the air during the operation of the molding machine. Although the blow tank tends to reduce the amount of pressure drop described above, the problem is not fully solved.

Even with the use of external blow tanks, the air pressure drop in the cavities of the molding machine is still not optimal with the prior art. The prior art air pressure regulator that reduces the pressure of the air moving from the compressor and through a blow tank on to the molding machine still cannot respond fast enough to detect the drop in air pressure at the molding machine and adjust the air flow to the molding machine in time to minimize the reduction in air pressure.

SUMMARY OF THE INVENTION

Briefly described, this invention concerns improved control of the supply of compressed air to the multiple cavities of a molding machine and to other cyclically repetitive air operated machines. An optimized dome loaded air pressure regulator assembly controls the flow of pressurized air to a molding machine, which includes an external pressure sensing line that more quickly senses the reduction in pressure when the blow valves open.

A form of the invention disclosed herein includes a dome loaded air pressure regulator that provides improved control of the flow and pressure of air moving from an elevated pressure source to an operating device, such as the molding machine or to another delivery point that operates at a lower pressure.

The dome loaded air pressure regulator has a diaphragm with an outer surface and an inner surface. A self-venting or bleeding style pilot regulating valve passes air pressure from the air supply at a substantially constant air pressure to the outer surface of the diaphragm, urging the valve disc against the force of the spring 36, toward the valve open position. See FIG. 2. The air pressure in the delivery conduit between the pressure regulator and the molding machine is fed back to the valve housing via an external sensing line, to the inner surface of the diaphragm 35, to balance the force against the outer surface of the diaphragm 34. The feedback air pressure communicates the pressure changes of the operating machine more rapidly to the air pressure regulator, providing quicker response, to supply the required pressure and volume of air by the air regulator to the molding machine. This substantially reduces the air pressure reduction at the start of the molding process. The regulator also achieves the desired cavity pressure faster, resulting in less scrap, faster cycle rates, higher quality parts, and the ability to lower the regulator setpoint pressure to eliminate wasted air consumption.

The air pressure regulator may include a valve body with an inlet opening for receiving elevated pressure air and an outlet opening for discharging the air at a lower pressure to the operating device, an air passage extends through the valve body from the inlet opening to the outlet opening for passing air through the valve body, and a valve seat surrounds the air passage, a valve assembly is movable in the air passage through the valve seat. The valve assembly including a disc valve movable toward and away from the valve seat for regulating the flow of air through the air passage.

The diaphragm includes a reference pressure application surface on the outer side of the diaphragm for receiving elevated pressure air from the pilot regulating valve for opening the valve, and the process pressure application surface on the inner side of the diaphragm for receiving air pressure for opposing the force applied by the reference pressure application surface for closing the valve.

An air delivery conduit extends from the outlet opening of the valve body to the operating device, a return port in the valve body extends from outside the valve body to the inner application surface of the diaphragm. This connection goes to a point just before the blow valves. This applies blow pressure air to the inner diaphragm surface for opposing the force applied by the reference pressure applied to the outer application surface of the diaphragm.

Thus, it is an object of this invention to provide an improved air supply system for a production machine such as a molding machine or the like that modulates the pressure and controls the flow of compressed air moving to the machine, and that maintains an extended supply of air at the desired pressure to the production machine.

Other objects, features and advantages of the invention will become apparent upon reading the following specification when taken in conjunction with the accompanying drawings.

DETAILED DESCRIPTION

Figure 3:
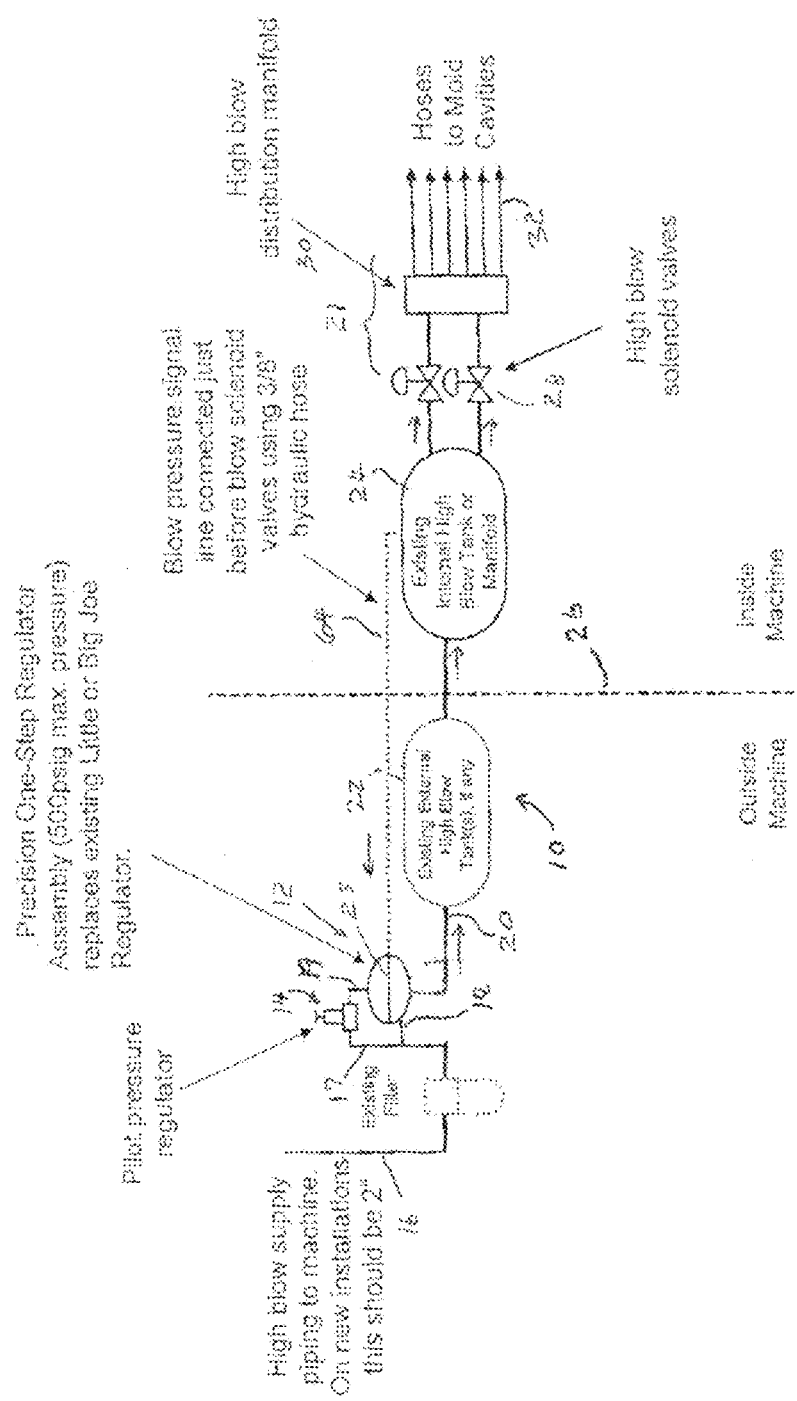
FIG. 3 is a diagram of the components of the invention and how they are functionally connected together.

Referring now in more detail to the drawings in which like numerals indicate like parts throughout the several views, FIG. 3 shows the air flow control assembly 10 that controls the air stream delivered to a molding machine, through a blow distribution manifold 30 and individual hoses 32 that lead to the cavities of a molding machine.

Figure 4:
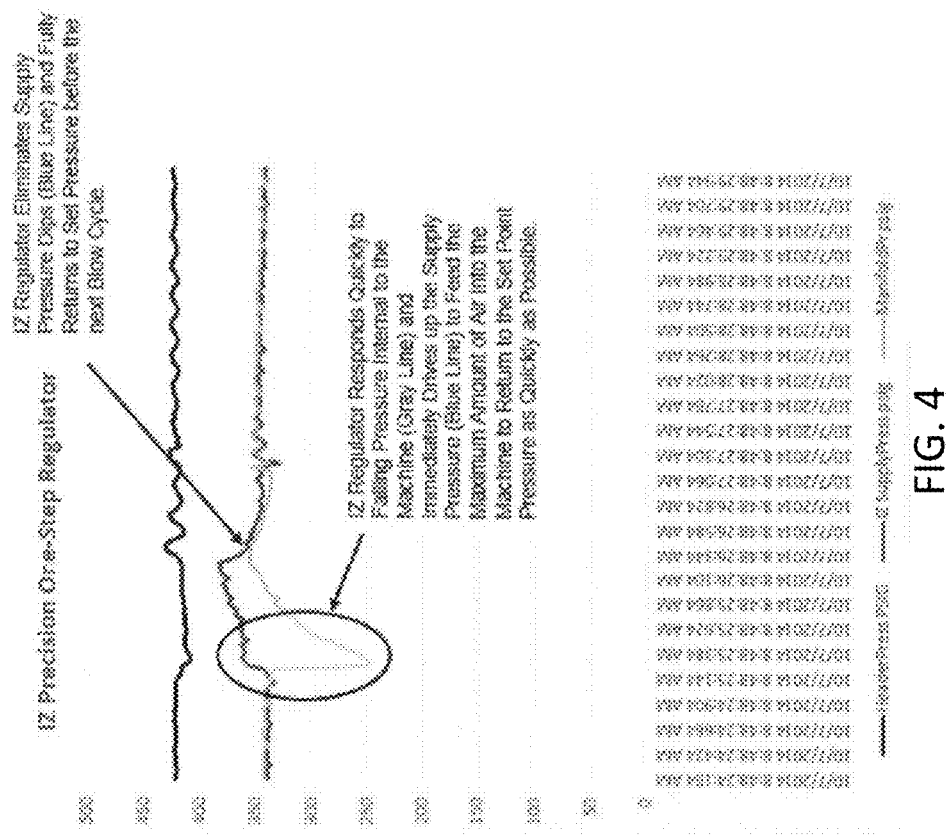
FIG. 4 illustrates the improved pressure changes in the compressed air in a cycle of a molding machine outfitted with the invention.

FIG. 4 shows the sequence of air pressures to mold cavities during a cycle of the molding machine utilizing the dome loaded regulator invention method. This illustrates how the invention allows the supply pressure exiting the dome loaded regulator to be boosted above the reference or setpoint pressure to more quickly stop the pressure droop or falling pressure and bring the mold pressure back up towards the desired level. Typically, the regulator outlet pressure does not drop below setpoint as the prior art does. The dip inside the oval on FIG. 4 shows the reduction of the air pressure being minimized at the start of the molding process and the full recovery of the air pressure back to the setpoint pressure at the end of each cycle. The temporary decrease in air pressure in the mold cavities at the beginning of a filling cycle, under the prior art, is caused by the air supply system not being able to quickly sense the reduction in mold pressure and respond appropriately.

As shown in FIG. 3, the air flow control assembly includes an air pressure regulator 12 and a pilot regulating valve 14 that are pneumatically connected together for receiving and controlling the pressurized air from the supply air conduit 16 and passing the regulated air to the molding machine 21. As shown in FIG. 3, conduit 18 passes the stream of pressurized air from the supply inlet air pressure conduit 16 through the dome loaded air pressure regulator 12 and through the delivery conduit 20 toward the molding machine. In the meantime, branch conduit 17 applies the pressurized supply air from the pressurized supply inlet conduit 16 to the pilot regulating valve 14. This provides the reference (setpoint) pressure for the air stream moving from delivery conduit 20 through the blow solenoid valves 28, distribution manifold 30 and delivery hoses 32 that lead to the individual cavities of the mold machine (not shown).

Typically, the pressure of the inlet air stream from pressure inlet conduit 16 entering the air pressure regulator 12 and the pilot regulating valve 14 may be at about 100-500 pounds per square inch, and the air pressure leaving the air pressure regulator 12 may be at about 100-500 psi. Other pressure conditions may be used based on, for example, the sizes of the equipment, the capacities of the blow machine, and the distances between the components of the equipment.

Figure 5:
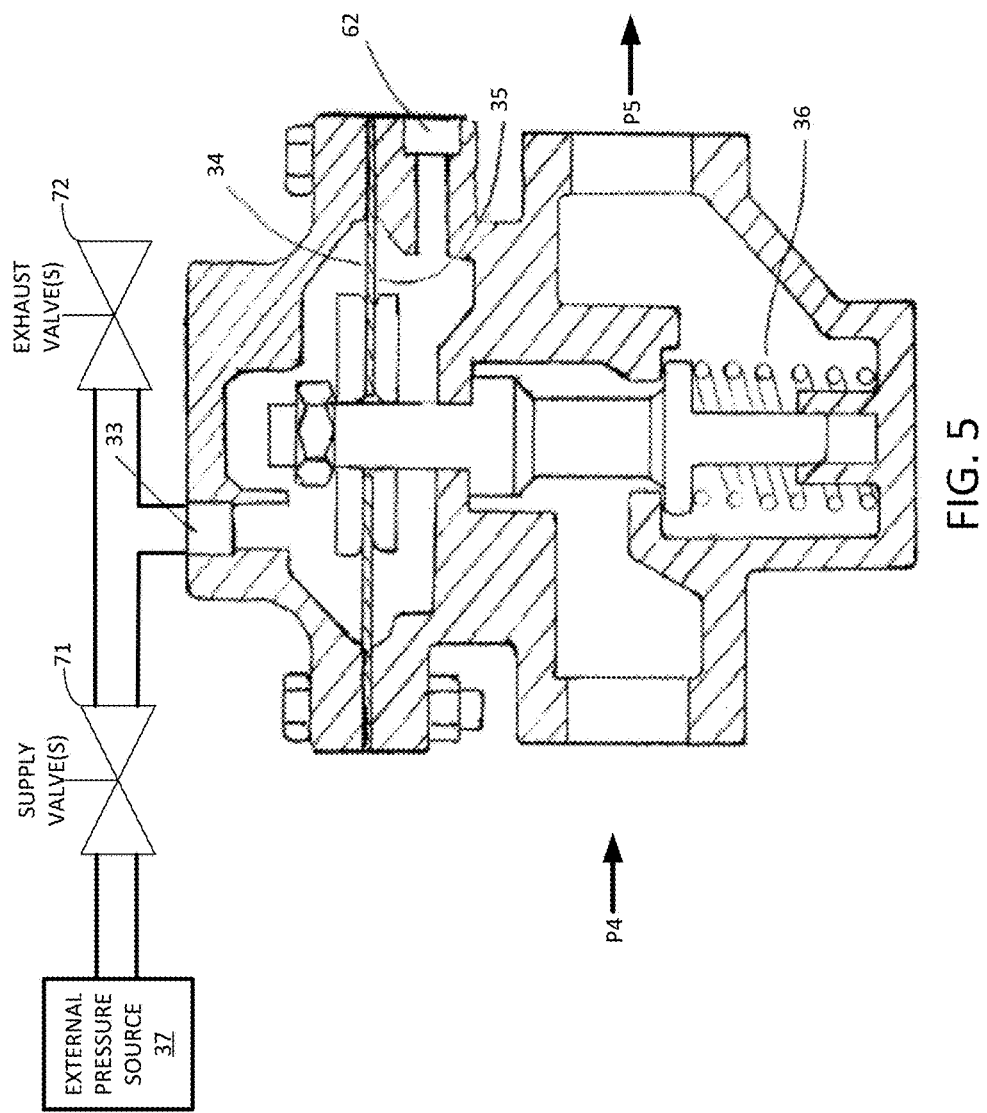
FIG. 5 is a cross-sectional of the dome loaded air pressure regulator in accordance with another embodiment in which the dome loaded air pressure regulator port is coupled to two or more supply valves and exhaust valves, which modulate mechanically or electrically the reference or setpoint pressure for applying the reference or setpoint pressure air to the outer side pressure application surface of the diaphragm.

Pilot valve 14 (FIG. 3) may be a prior art regulator valve that includes a spring biased diaphragm valve (not shown in detail) that controls the movement of a disc valve that restricts the flow of air through a valve seat and reduces the pressure of the air flowing from the pressurized supply inlet conduit 16 and through the pilot controlled air conduit 19. The pilot controlled air then passes from the pilot control pressure conduit 19 at the reduced pressure to the dome loaded air pressure regulator port 33 shown in FIG. 2 which is connected to the outer surface of the diaphragm 34, to control the reference or setpoint pressure of the air moving to the molding machine 21. An alternative to using the pilot valve 14 is to connect an external pressure source 37 (FIG. 2), such as a bottle of regulated air, to the dome loaded air pressure regulator port 33 via a conduit 38 to control the reference or setpoint pressure of the air moving to the molding machine 21. Yet another alternative to the pilot valve 14 is shown in FIG. 5. FIG. 5 is a cross-sectional view of the dome loaded air pressure regulator in accordance with another embodiment in which the dome loaded air pressure regulator port 33 is coupled to two or more supply valves 71 and exhaust valves 72, which modulate, mechanically or electrically, the reference or setpoint pressure for applying the reference or setpoint pressure air to the outer side pressure application surface of the diaphragm.

The air pressure regulator 12 is also connected to the same source of elevated pressure air through supply pressure conduit 16 and branch conduit 18, and the elevated pressure air is modulated in the air pressure regulator 12 to the desired lower pressure. The regulated lower pressure air is delivered through delivery conduit 20, toward the molding machine 21.

Typically, the air pressure regulator 12 will be positioned outside the structure of the molding machine 21 as represented by the vertical dash line 26 of FIG. 3.

The delivery conduit 20, in some cases, delivers the modulated air through one or more high blow tanks 22 and 24. The modulated air pressure moves through any blow tanks, passing through solenoid valves 28 and through their delivery conduits to the high blow distribution manifold 30, and then through the delivery hoses 32 to mold cavities (not shown).

Figure 1:
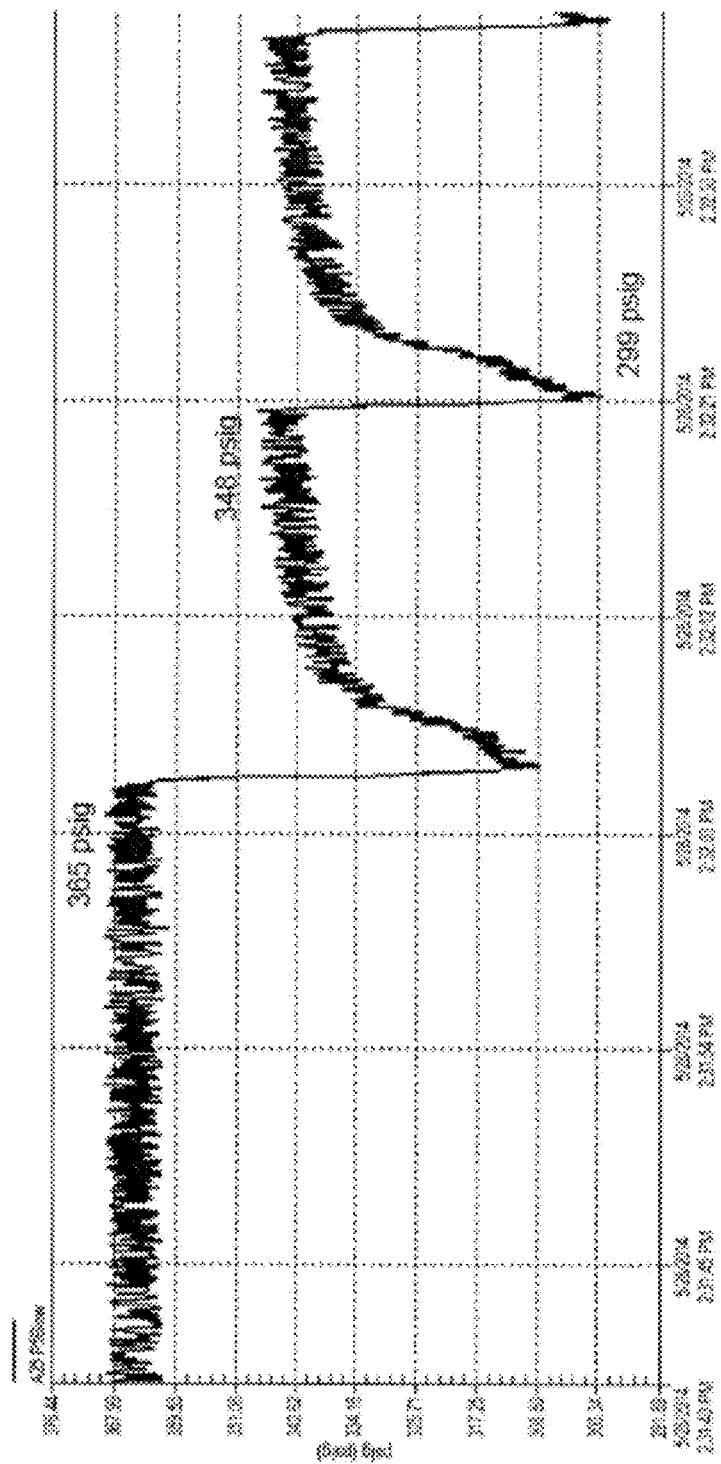
FIG. 1 illustrates the pressure changes in the compressed air in a cycle of a prior art production machine.
Figure 2:
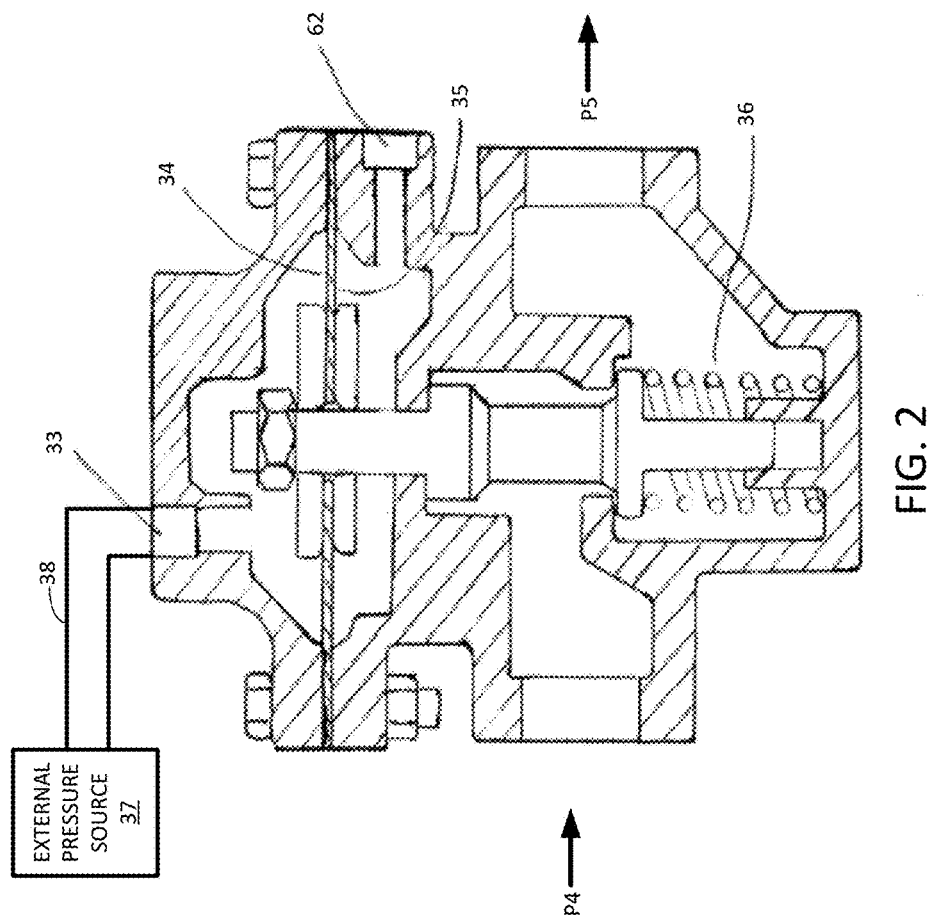
FIG. 2 is a cross sectional view of the dome loaded air pressure regulator.

The pressurized inlet air stream is shown by the arrow P4 and the outlet air stream is shown by arrow P5 in FIG. 2. The dome loaded air pressure regulator 12 consists of a pilot operated design that provides optimal performance in a high volume cyclical application such as this one.

Pilot valve 14 (FIG. 3) applies its modulated air pressure through controlled air conduit 19 to the primary air pressure regulator of FIG. 2. This acts as a reference pressure and is the setpoint pressure for the system.

An external signal pressure line 64 communicates with the internal high blow tank or manifold pressure to port 62 (FIG. 2) of the dome loaded air pressure regulator. This is compared to the reference pressure and determines if the air pressure regulator needs to open or close to try and maintain the setpoint pressure. As shown in FIG. 2, the return port 62 is in open communication through signal pressure line 64 of FIG. 3, in the downstream direction of the air flow of the assembly, and connected to the blow tank 24 that is close to the mold cavities inside the machine. This direct communication from the blow tank closest to the mold cavities back to the inner surface of the diaphragm 35 of the air pressure regulator provides direct and open communication between the blow tank and the air pressure regulator of FIG. 2, so that unobstructed communication of the varying pressure closest to the mold cavities occurs. This tends to more quickly perceive the change in high blow air pressure allowing for fast communication and therefore early response to the drop in air pressure, allowing the air pressure regulator to respond earlier.

Figure 6:
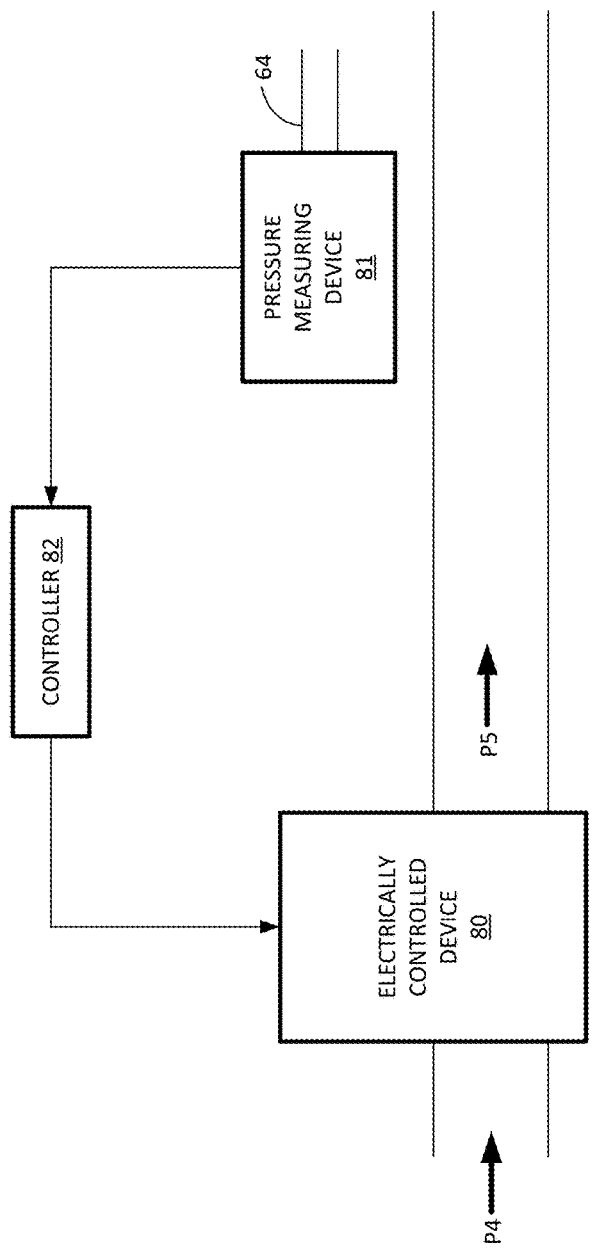
FIG. 6 is a block diagram of an electrical device, such as a stepper motor controlled valve, a local or remote pressure measuring device, and a controller that may be used in combination to accomplish the invention method.

Those familiar with the embodiment of the patent can also imagine this function being performed using an electrical instead of the mechanical method shown in the invention. FIG. 6 is a block diagram of an electrically controlled device 80, such as a stepper motor controlled valve, a local or remote pressure measuring device 81, and a controller 82 that may be used in combination to accomplish the invention method. The pressure measuring device 81 measures the pressure of external signal pressure line 64 (FIG. 3) and sends the local or remote pressure signal to the controller 82, which then sends a signal to the electrically controlled device 80 (e.g., the stepper motor controlled valve) telling it which direction to move and at what rate of speed to regulate the downstream pressure being supplied to the mold cavities.

Although preferred embodiments of the invention have been disclosed in detail herein, it will be obvious to those skilled in the art that variations and modifications of the disclosed embodiments can be made without departing from the spirit and scope of the invention as set forth in the following claims.

The invention claimed is:

1. A dome loaded air pressure regulator assembly for controlling the movement of pressurized supply air from one or more compressors to an operating device at a regulated lower pressure, comprising:
   a valve body with an inlet opening connected to an inlet air conduit for receiving pressurized inlet air from said one or more compressors and an outlet opening for discharging air at a lower pressure to the operating device;
   an air passage extending through the valve body from the inlet opening to the outlet opening for passing air through the valve body, and a valve seat surrounding the air passage;
   a valve assembly including a disc valve movable toward and away from the valve seat for regulating the flow of air through the air passage;
   a spring at one end of the disc valve for biasing the disc valve toward a closed position with the valve seat;
   a diaphragm at the other end of the disc valve for biasing the disc valve toward an open position, the diaphragm including a reference or setpoint pressure application surface on the outer side of the diaphragm for receiving reference or setpoint pressurized air for opposing the force of the spring and for opening the valve, and a process pressure application surface on the inner side of the diaphragm for receiving process signal pressure air for opposing the force of the reference or setpoint pressurized air received by the reference or setpoint pressure application surface for closing the valve;
   an air delivery conduit extending from the outlet opening of the valve body to the operating device;
   a return port in the valve body extending from outside the valve body to the inner pressure application surface of the diaphragm for connection externally to the operating device; and
   a process signal air pressure line extending from the operating device or from an air tank connected to the operating device back to the return port of the valve body for applying process signal pressure air from the operating device or from the air tank connected to the operating device to the process pressure application surface of the diaphragm for opposing the force of the pressurized air applied to the reference or setpoint pressure application surface of the diaphragm.

2. The dome loaded air pressure regulator assembly of claim 1, and further including an external blow tank with an air inlet for receiving elevated pressure air from said one or more compressors and an air outlet for delivering air from the blow tank to the air regulator.

3. The dome loaded air pressure regulator assembly of claim 1, wherein the air delivery conduit includes an internal blow tank for accumulating pressurized air from the air pressure regulator and delivering the air to the operating device.

4. The dome loaded air pressure regulator assembly of claim 3, and further including a pilot regulating valve connected between the inlet air conduit and the reference or setpoint pressure application surface of the diaphragm for applying the reference or setpoint pressure air to the reference or setpoint pressure application surface.

5. The dome loaded air pressure regulator assembly of claim 3, and further including an external pressure source connected to the valve body for applying the reference or setpoint pressure air to the reference or setpoint pressure application surface of the diaphragm.

6. The dome loaded air pressure regulator assembly of claim 3, and further including two or more supply and exhaust valves to modulate, mechanically or electrically, the reference or setpoint pressure air applied to the reference or setpoint pressure application surface of the diaphragm.

7. The dome loaded air pressure regulator of claim 1, further comprising an electrically controlled device with a local or remote pressure measuring device that send a signal to a controller connected to the electrically controlled device.

8. The dome loaded air pressure regulator assembly of claim 1, wherein the process signal air pressure line extends from the air tank back to the return port.

9. The dome loaded air pressure regulator assembly of claim 1, wherein the process signal air pressure line extends from the operating device back to the return port.

10. The dome loaded air pressure regulator assembly of claim 1, wherein the return port of the valve body is located just below the process pressure application surface of the diaphragm and in between the outlet opening and the process pressure application surface of the diaphragm.

11. A dome loaded air pressure regulator assembly for controlling the movement of pressurized supply air from one or more compressors to an operating device at a regulated lower pressure, comprising:
    a valve body with an inlet opening connected to an inlet air conduit for receiving pressurized inlet air from said one or more compressors and an outlet opening for discharging the pressurized inlet air at a lower pressure to the operating device;
    an air passage extending through the valve body from the inlet opening to the outlet opening for passing air through the valve body, the air passage having a valve seat therein;
    a valve assembly, the valve assembly including a disc valve movable toward and away from the valve seat for regulating a flow of air through the air passage;
    a spring at one end of the disc valve for biasing the disc valve toward a closed position with the valve seat;
    a diaphragm at the other end of the disc valve for biasing the disc valve toward an open position, the diaphragm including a reference or setpoint pressure application surface for receiving pressurized air for opposing the force of the spring and for opening the valve, and a process pressure application surface for receiving process signal air pressure for opposing the force of the pressurized air received by the reference or setpoint pressure application surface for closing the valve;
    an air delivery conduit extending from the outlet opening of the valve body to the operating device;
    a return port in the valve body extending from outside the valve body to the process pressure application surface of the diaphragm; and
    a process signal air pressure line having a first end disposed at a location at or sufficiently near the operating device to receive a portion of pressurized air received in the operating device, the process signal air pressure line having a second end connected to the return port of the valve body for providing the portion of the pressurized air to the process pressure application surface of the diaphragm for opposing the force of the pressurized air received by the reference or setpoint pressure application surface of the diaphragm.

* * * * *